(12) United States Patent
Lee et al.

(10) Patent No.: US 9,876,440 B1
(45) Date of Patent: Jan. 23, 2018

(54) ACTIVE RECTIFIER CAPABLE OF PREVENTING REVERSE LEAKAGE CURRENT

(71) Applicant: RESEARCH & BUSINESS FOUNDATION SUNGKYUNKWAN UNIVERSITY, Suwon-si (KR)

(72) Inventors: Kang Yoon Lee, Seoul (KR); Seong Jin Oh, Suwon-si (KR); Youngoo Yang, Hwaseong-si (KR); Keum Cheol Hwang, Seoul (KR); Young Jun Park, Mungyeong-si (KR); Sang Yun Kim, Suwon-si (KR); Byeong Gi Jang, Suwon-si (KR); Jung Yeon Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/394,160

(22) Filed: Dec. 29, 2016

(30) Foreign Application Priority Data

Sep. 29, 2016 (KR) .......................... 10-2016-0125702

(51) Int. Cl.
*H02M 7/219* (2006.01)
*H02M 1/08* (2006.01)
*H02M 7/217* (2006.01)

(52) U.S. Cl.
CPC ............ *H02M 7/219* (2013.01); *H02M 1/081* (2013.01); *H02M 7/217* (2013.01); *H02M 2007/2195* (2013.01)

(58) Field of Classification Search
CPC ................. H02M 7/217; H02M 7/219; H02M 2007/2195; H02M 1/081
See application file for complete search history.

(56) References Cited

U.S. PATENT DOCUMENTS

| | | | |
|---|---|---|---|
| 6,324,084 B1* | 11/2001 | Fujisawa | G04G 19/02 363/127 |
| 6,373,790 B1* | 4/2002 | Fujisawa | H02J 7/027 320/134 |
| 2009/0066382 A1* | 3/2009 | Yousefzadeh | H02M 3/1584 327/175 |
| 2012/0051109 A1* | 3/2012 | Kim | H02M 1/083 363/127 |

(Continued)

*Primary Examiner* — Fred E Finch, III
*Assistant Examiner* — Rafael O De Leon Domenech
(74) *Attorney, Agent, or Firm* — NSIP Law

(57) ABSTRACT

Disclosed herein is an active rectifier. The rectifier includes a rectifier unit, a driver unit, and a switching device control circuit unit. The rectifier unit includes first and fourth transistors configured to become conductive when the voltage of an alternating current (AC) input is negative and apply the current of the AC input to a rectifier capacitor, and second and third transistors configured to become conductive when the voltage of the AC input is positive and apply the current of the AC input to the rectifier capacitor. The driver unit outputs first to fourth drive control signals, and drives the first to fourth transistors. The switching device control circuit unit compares the first drive control signal and the second drive control signal with the AC input, and outputs switching device control signals to delay the first to fourth drive control signals based on the extents to delay.

9 Claims, 7 Drawing Sheets

(56) References Cited

U.S. PATENT DOCUMENTS

2015/0146466 A1* 5/2015 Kim .................. H02M 7/219
                                                363/127
2015/0263534 A1* 9/2015 Lee .................. H02M 7/219
                                                307/104

* cited by examiner

ACTIVE RECTIFIER CAPABLE OF PREVENTING REVERSE LEAKAGE CURRENT

CROSS REFERENCE TO RELATED APPLICATION(S)

This application claims the benefit under 35 USC 119(a) of Korean Patent Application No. 10-2016-0125702, filed on Sep. 29, 2016, in the Korean Intellectual Property Office, the entire disclosure of which is incorporated herein by reference for all purposes.

BACKGROUND

1. Technical Field

The present disclosure relates generally to an active rectifier, and more particularly to an active rectifier that is capable of preventing reverse leakage current from being generated due to the difference between a control signal output from a switching device and an actually applied drive control signal.

2. Description of the Related Art

FIG. 1 is a circuit diagram of a typical active rectifier. An active rectifier is a switching device, and uses lateral double-diffused metal oxide semiconductor field effect transistors (LD-MOSFETs) and generates output voltage by controlling the gates of the LD-MOSFETs. Since voltage $V_{RECT}$ is not generated in the early stage of driving, it is impossible to perform gate control of the switching device. When all the MOSFETs M1 to M4 are turned off because gate voltage is not applied, rectification operation is performed by the back-gate diodes of the LD-MOSFETs. When operation is performed by the back-gate diodes, voltage drop occurs in the diodes and thus efficiency is low. After the voltage $V_{RECT}$ has risen to or above a predetermined voltage, gate control can be performed.

In the case of the gate control, the MOSFETs M2 and M3 are controlled to be simultaneously turned on by a control circuit, in which case the MOSFETs M1 and M4 are allowed to be turned off, thereby preventing current $I_{AC}$ from flowing to a negative side. In contrast, when the MOSFETs M2 and M3 are turned off, the MOSFETs M1 and M4 are controlled to be simultaneously turned on, so that a rectifier capacitor $C_{RECT}$ is charged with current and thus an active rectifier operation is implemented.

In the case of a conventional switching device control circuit, the switching device control circuit is synchronized simply based on input voltage $V_{AC}$ or input current $I_{AC}$ and controls switching devices, and thus actual switching device control is delayed behind a desired interval due to internal circuit delay occurring in a control circuit, a driver, etc. used for the driving of the switching device. Due to the delay of the control, reverse leakage current flows in proportion to the delay, which results in a reduction in efficiency.

FIG. 2 shows internal circuit delay when a switching device control signal is generated and actually applied to a switching device. It can be seen that although a switching device control signal is generated in synchronization with voltage $V_{AC}$ or current $I_{AC}$, the switching device control signal is delayed due to internal circuit delay when being actually applied to a switching device, and reverse leakage current is generated as MOSFETs M1 and M3 are simultaneously turned on.

Therefore, there is a need for an active rectifier that is capable of preventing reverse leakage current from being generated due to the difference between a control signal output from a switching device and an actually applied drive control signal.

PRECEDING TECHNICAL DOCUMENT

Patent Document

Korean Patent Application Publication No. 10-2012-0020220 (published on Mar. 8, 2012)

SUMMARY

At least one embodiment of the present disclosure is directed to the provision of an active rectifier that is capable of preventing reverse leakage current from being generated.

In accordance with an aspect of the present invention, there is provided an active rectifier, including: a rectifier unit including first and fourth transistors configured to become conductive in an interval in which the voltage of an alternating current (AC) input is negative and to apply the current of the AC input to a rectifier capacitor, and second and third transistors configured to become conductive in an interval in which the voltage of the AC input is positive and to apply the current of the AC input to the rectifier capacitor; a driver unit configured to output first to fourth drive control signals adapted to be applied to the gates of the first to fourth transistors and drive the first to fourth transistors; and a switching device control circuit unit configured to compare the first drive control signal applied to the gate of the first transistor and the second drive control signal applied to the gate of the second transistor with the AC input, and to output switching device control signals adapted to delay the first to fourth drive control signals based on the extents to which the first and second drive control signals have been delayed.

The active rectifier may further include a feedback control switch configured to control whether to input the first drive control signal and the second drive control signal to the switching device control circuit unit.

The switching device control circuit unit may be further configured to compare the first drive control signal and the second drive control signal with the AC input, and to turn off the feedback control switch when the first drive control signal and the second drive control signal have not been delayed.

The switching device control circuit unit may include: control circuit modules configured to receive the first drive control signal, the second drive control signal and the AC input, to compare the first drive control signal and the second drive control signal with the AC input, and to output delay extent control signals indicative of the extents of delay; and open-type delay circuit modules configured to receive the AC input, to process the AC input signal into a signal required for delay control, to receive the delay extent control signals output from the control circuit module, and to output switching device control signals adapted to match the extents of delay of the drive control signals to the extent of delay of the AC input by using the signal required for delay control and the delay extent control signal.

Each of the control circuit modules may include: a voltage limiter configured to output the received AC input as a square waveform AC input; and a digital phase detector configured to compare the square waveform AC input, output from the voltage limiter, with the received first drive control signal, and to output an up/down counter signal corresponding to a corresponding one of the delay extent control signals.

Each of the open-type delay circuit modules may include: a voltage limiter configured to output the received AC input as a square waveform AC input; an edge detector configured to output a signal obtained by detecting an edge of the square waveform AC input output from the voltage limiter; a delay line configured to receive the signal output from the edge detector, and to output a plurality of signals obtained by delaying the signal by various times; a multiplexer configured to select and output any one of the plurality of signals output from the delay line by receiving and using the delay extent control signal; and SR latches each configured to receive the signal output from the edge detector and the signal output from the multiplexer, and to output the switching device control signal.

The delay line may include a coarse delay cell and a plurality of fine delay cells.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
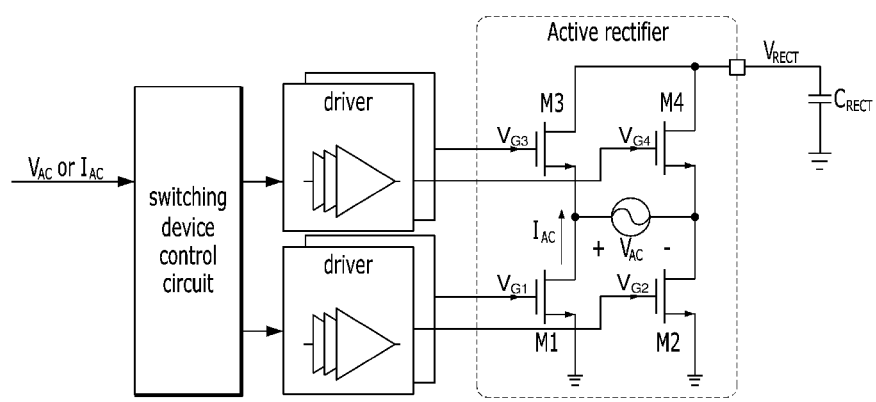
FIG. 1 is a circuit diagram of a typical active rectifier.
Figure 2:
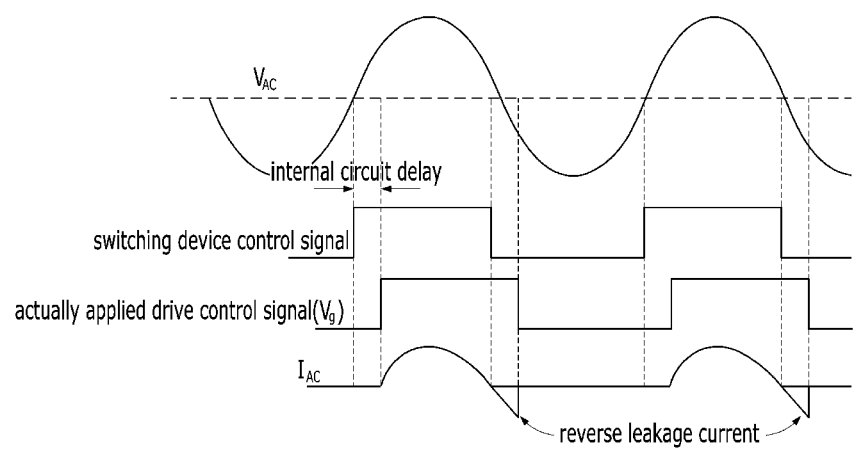
FIG. 2 is a reference diagram showing internal circuit delay when a switching device control signal is generated and actually applied to a switching device.

Embodiments of the present invention are described with reference to the accompanying drawings in order to describe the present invention in detail so that those having ordinary knowledge in the art to which the present invention pertains can easily practice the present invention. As can be easily understood by those having ordinary knowledge in the art to which the present invention pertains, the following embodiments may be modified in various forms within the range that does not depart from the spirit and scope of the present invention. Throughout the drawings, the same reference numerals are used to denote the same or similar elements as much as possible.

The terms used herein are used merely to describe specific embodiments, and are not intended to limit the present invention. A singular form may include a plural form unless otherwise defined.

The terms, including "comprise," "includes," "comprising," "including" and their derivatives, specify the presence of described features, regions, integers, steps, operations, elements, and/or components, and do not exclude the possibility of the presence or addition of one or more other features, regions, integers, steps, operations, elements, and/or components.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meanings in the context of the specification and relevant art but should not be interpreted in an idealized or overly formal sense unless expressly so defined herein.

An active rectifier according to the present disclosure will be described in detail below with reference to the accompanying drawings.

Figure 3:
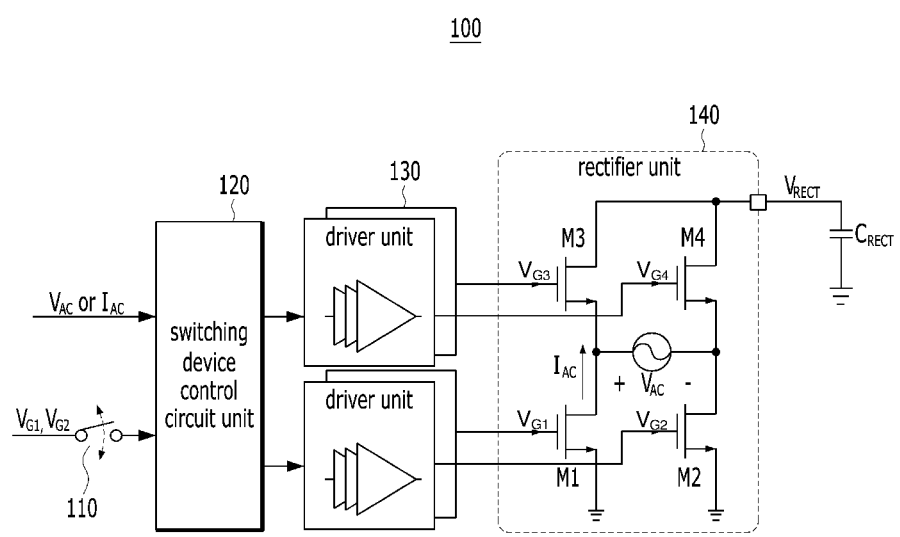
FIG. 3 is a circuit diagram schematically showing the configuration of an active rectifier according to an embodiment of the present disclosure.

FIG. 3 is a circuit diagram schematically showing the configuration of an active rectifier 100 according to an embodiment of the present disclosure.

Referring to FIG. 3, the active rectifier 100 according to the present embodiment includes a switching device control circuit unit 120, a driver unit 130, and a rectifier unit 140.

The rectifier unit 140 may include first to fourth transistors M1 to M4. The first and fourth transistors M1 and M4 may become conductive in an interval in which the voltage of an alternating current (AC) input $V_{AC}$ is negative, and may apply the current of the AC input $V_{AC}$ to a rectifier capacitor $C_{RECT}$. The second and third transistors M2 and M3 may become conductive in an interval in which the voltage of the AC input $V_{AC}$ is positive, and may apply the current of the AC input $V_{AC}$ to the rectifier capacitor $C_{RECT}$.

According to an embodiment of the present disclosure, the first to fourth transistors M1 to M4 may be Lateral Double-diffused Metal Oxide Semiconductor Field Effect Transistors (LD-MOSFETs).

The driver unit 130 may output drive control signals $V_{G1}$ to $V_{G4}$ adapted to be applied to the gates of the first to fourth transistors and drive the first to fourth transistors.

The switching device control circuit unit 120 may compare the signal $V_{G1}$, applied to the gate of the first transistor, and the signal $V_{G2}$, applied to the gate of the second transistor, with the AC input $V_{AC}$, and may output switching device control signals adapted to delay the drive control signals $V_{G1}$ to $V_{G4}$ based on the extents to which the drive control signals $V_{G1}$ and $V_{G2}$ have been delayed.

The switching device control circuit unit 120, the driver unit 130, and the rectifier unit 140 correspond to the switching device control circuit, driver, and rectifier of the conventional active rectifier, respectively, shown in FIG. 1. Accordingly, the basic functions of the switching device control circuit unit 120, driver unit 130 and rectifier unit 140 are the same as those of the switching device control circuit, driver and rectifier of the conventional active rectifier shown in FIG. 1, those having ordinary knowledge in the art to which the present disclosure pertains are fully aware of the roles of the above components, and thus unnecessary descriptions are omitted. The following description will be given, with a focus on the differences between the active rectifier 100 according to the present disclosure and the conventional technology.

The active rectifier 100 according to the present embodiment may be configured such that final-stage actually applied drive control signals $V_{G1}$ and $V_{G2}$ are input to the switching device control circuit unit 120, unlike the conventional active rectifier. The switching device control circuit unit 120 may receive the final-stage actually applied drive control signals $V_{G1}$ and $V_{G2}$, and may measure the extents to which the drive control signals $V_{G1}$ and $V_{G2}$ have been delayed compared to the AC input $V_{AC}$ by comparing the final-stage actually applied drive control signals $V_{G1}$ and $V_{G2}$ with the AC input $V_{AC}$. Furthermore, the switching device control circuit unit 120 may output switching device control signals to the driver unit 130 based on the extents of delay.

The active rectifier 100 according to the present embodiment may further include a feedback control switch 110 configured to control whether to input the actually applied drive control signals $V_{G1}$ and $V_{G2}$ to the switching device control circuit unit 120.

In this case, the switching device control circuit unit 120 may turn off the feedback control switch 110 when there is no delay when the actually applied drive control signals $V_{G1}$ and $V_{G2}$ are compared with the AC input $V_{AC}$.

Figure 4:
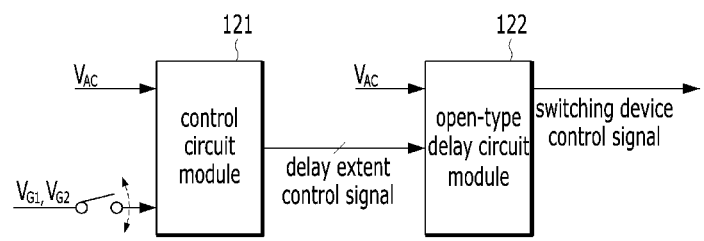
FIG. 4 is a block diagram schematically showing the configuration of a switching device control circuit unit according to an embodiment of the present disclosure.

FIG. 4 is a block diagram schematically showing the configuration of a switching device control circuit unit 120 according to an embodiment of the present disclosure.

Referring to FIG. 4, the switching device control circuit unit 120 according to the present embodiment may include a control circuit module 121 and an open-type delay circuit module 122.

The control circuit module 121 may receive drive control signals $V_{G1}$ and $V_{G2}$ and an AC input $V_{AC}$. Furthermore, the control circuit module 121 may output delay extent control signals indicative of the extents of delay to the open-type delay circuit module 122 by comparing the drive control signals $V_{G1}$ and $V_{G2}$ with the AC input $V_{AC}$.

The open-type delay circuit module 122 may receive the AC input $V_{AC}$, and may process the AC input $V_{AC}$ into a signal required for delay control. Furthermore, the open-type delay circuit module 122 may receive the delay extent control signals output from the control circuit module 121. Furthermore, the open-type delay circuit module 122 may output switching device control signals adapted to match the extents of delay of the drive control signals $V_{G1}$ to $V_{G4}$ to the extent of delay of the AC input $V_{AC}$ by using the signal required for delay control and the delay extent control signals.

The difficult part of rectifier control is to predict a point at which reverse leakage current starts to flow and then perform control by performing synchronization. In the driving of the rectifier, when reverse leakage current is generated because synchronization is not desirably performed, the operation of the rectifier itself is stopped and an AC input waveform itself is distorted, with the result that the appropriate operation of the rectifier cannot be performed.

The function of the switching device control circuit unit 120 according to the present embodiment is to synchronize the falling edges of the signals $V_{G1}$ to $V_{G4}$, finally output from the driver unit 130, with the two phases $V_{AC1}$ and $V_{AC2}$ of the AC input $V_{AC}$. Accordingly, the switching device control circuit unit 120 according to the present embodiment requires two control circuit modules 121 configured to process the drive control signals $V_{AC1}$ and $V_{AC2}$, respectively, and two open-type delay circuit modules 122 configured to process the drive control signals $V_{AC1}$ and $V_{AC2}$, respectively. However, since the two control circuit modules 121 configured to process the drive control signals $V_{AC1}$ and $V_{AC2}$, respectively, are the same in configuration and operation as each other and the two open-type delay circuit modules 122 configured to process the drive control signals $V_{AC1}$ and $V_{AC2}$, respectively, are the same in configuration and operation as each other, the following description will be given with reference to FIG. 5 in which the control circuit module 121 and open-type delay circuit module 122 configured to process the signal $V_{AC1}$ are shown. Meanwhile, although a description of a process of synchronizing the falling edges of the signals $V_{AC2}$ and $V_{G2}$ is omitted herein, it will be apparent that this process is the same as a process to be described herein.

Figure 5:
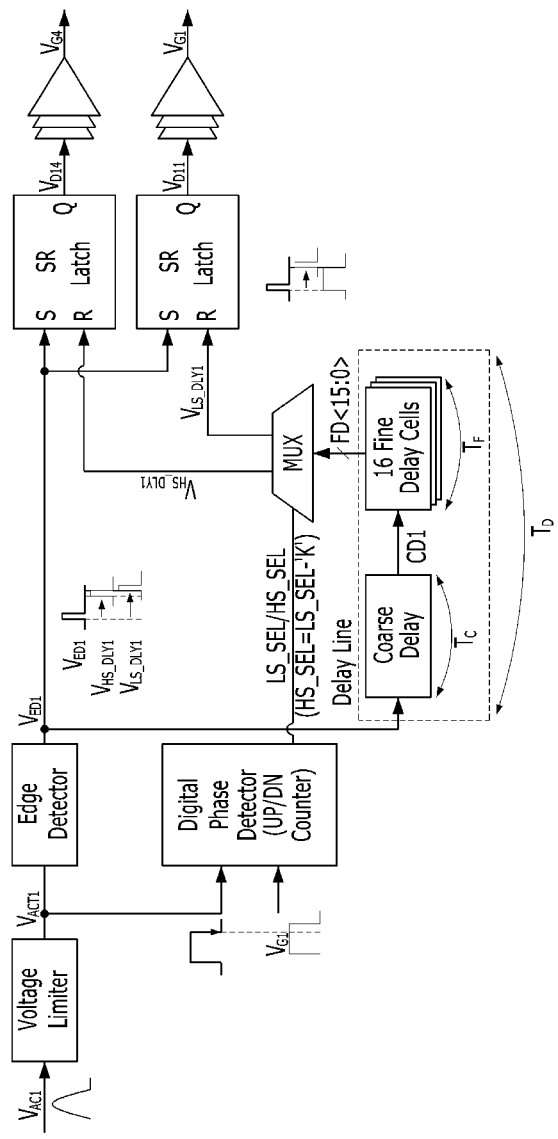
FIG. 5 is a detailed block diagram of a control circuit module and an open-type delay circuit module according to an embodiment of the present disclosure.

FIG. 5 is a detailed block diagram of a control circuit module and an open-type delay circuit module according to an embodiment of the present disclosure.

Figure 6:
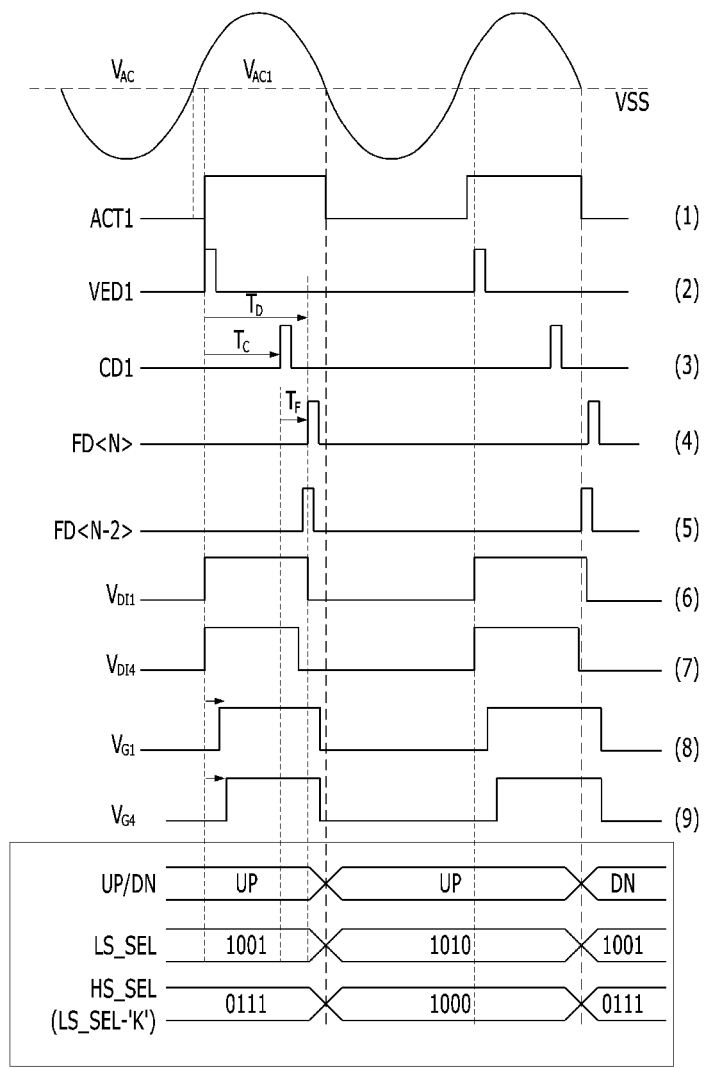
FIG. 6 is a signal waveform diagram showing a process in which a switching device control signal and an actually applied drive control signal are synchronized with each other in order to prevent reverse leakage current from being generated.

FIG. 6 is a signal waveform diagram showing a process in which a switching device control signal and an actually applied drive control signal are synchronized with each other in order to prevent reverse leakage current from being generated.

Referring to FIGS. 5 and 6, a process of synchronizing the falling edges of the signals $V_{AC1}$ and $V_{G1}$ will be described.

First, the waveform (0) of FIG. 6 is indicative of the input waveform $V_{AC1}$. The input waveform. $V_{AC1}$ is output as a square waveform $V_{ACT1}$ via a voltage limiter (a waveform (1)). In this case, the voltage of the output square waveform $V_{ACT1}$ may be 5 V. The square waveform $V_{ACT1}$ is compared with the signal $V_{G1}$ output from the driver unit 130, thereby determining whether the falling edges of the two signals have been synchronized with each other. Accordingly, the square waveform $V_{ACT1}$ is output as a signal $V_{ED1}$ in such a manner that only the edges of the square waveform $V_{ACT1}$ are detected via an edge detector (a waveform (2)). The signal $V_{ED1}$ is input to the set terminal of an SR latch, and, simultaneously, is applied to a delay line.

According to an embodiment of the present disclosure, the delay line may include a coarse delay cell and a plurality of fine delay cells. The number of the plurality of file delay cells may vary depending on the length of the time by which delay must be performed. When the time (ON duty) by which delay must be delayed is about 50 ns in the case of, for example, 6.78 MHz, it is inefficient in terms a circuit area and current consumption to implement all the above delay by using individual delay circuits. Accordingly, it may be possible to delay the signal $V_{ED1}$ to a point near a falling edge that must be achieved via the coarse delay cell and then perform fine delay via the plurality of fine delay cells. In this case, in FIGS. 5 and 6, the delay time obtained via the coarse delay cell is denoted by "TC," the delay time obtained via the plurality of fine delay cells is denoted by "TF," and the total delay time is denoted by "TD" (waveforms (3), (4), and (5)).

Meanwhile, FIG. 5 shows an example in which fine delay cells are 16 in number. The outputs of the respective 16 fine delay cells are input to a multiplexer as "FD<15:0>." The multiplexer may selectively output some of the 16 fine delay cell outputs corresponding to the difference between the falling edges of the square waveform $V_{ACT1}$ and the signal $V_{G1}$. For this purpose, the digital phase detector may output signals adapted to control the multiplexer.

The digital phase detector may receive the signal $V_{ACT1}$ and the signal $V_{G1}$. In this case, the signal $V_{ACT1}$ may be divided via a D-FF array and input as a 1/16-divided digital signal. The digital phase detector may compare the signal $V_{ACT1}$ with the signal $V_{G1}$, and may determine whether to increase or decrease delay time via an up/down counter (see the lower end portion of FIG. 6). The digital phase detector increases "LS_SEL" by "+1" when delay needs to be increased, and decreases "LS_SEL" by "−1" when delay needs to be decreased. "LS_SEL" is the abbreviation for "Low Side_SELect," and is a control signal adapted to cause the multiplexer to select a signal input to the lower SR latch (which outputs a signal "$V_{DI1}$" as a result) shown in FIG. 5. Furthermore, "HS_SEL" is the abbreviation for "High Side_SELect," and is a control signal adapted to cause the multiplexer to select a signal input to the upper latch SR (which outputs a signal "$V_{DI4}$" as a result) shown in FIG. 5. Meanwhile, in the driver unit 130 shown in FIG. 3, upper and lower drivers exhibit different delays, and thus HS_SEL is automatically calculated as a value (HS_SEL=LS_SEL−K) obtained by decreasing LS_SEL by K and then output in order to compensate for the difference between the delays. In the example shown in FIG. 6, the waveform (4) and the waveform (5) are indicative of "LS_SEL" and "HS_SEL," respectively. The waveform (4) is a signal FD<N> output after passing through "N" file delay cells of the 16 fine delay cells based on an arbitrary delay time. Furthermore, an arbitrary difference value K between "LS_SEL" and "HS_SEL" is "2," and the waveform (5) is a signal FD<N−2> output after having passed through a number of fine delay cells equal to a value obtained by decreasing LS_SEL by 2.

The signals $V_{LS\_DLY1}$ and $V_{HS\_DLY1}$ output via the multiplexer are input to the reset terminals of the SR latches, respectively, are combined with a signal $V_{ED1}$ input to the set terminals of the SR latches, and are output as signals $V_{DT1}$ and $V_{DI4}$ (a waveform (6), and a waveform (7)). The signals $V_{DT1}$ and $V_{DI4}$ are input to the upper and lower drivers of the driver unit 130, respectively. Furthermore, signals $V_{G1}$ and $V_{G4}$ are output via the driver unit 130 (a waveform (8), and a waveform (9)). As described above, the output signals $V_{G1}$ and $V_{G4}$ are fed back to the control circuit module 121 and, more specifically, to the digital phase detector.

Figure 7:
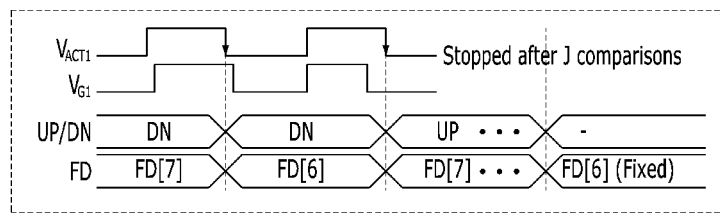
FIG. 7 shows an example in which the falling edges of a signal $V_{ACT1}$ and a signal $V_{G1}$ are synchronized after a predetermined time has elapsed in a digital phase detector.

FIG. 7 shows an example in which the falling edges of signals $V_{ACT1}$ and $V_{G1}$ are synchronized after a predetermined time has elapsed in a digital phase detector.

Referring to FIG. 7, there is shown a process in which a comparison operation is automatically stopped after comparisons (J comparisons) have been made during a predetermined time in the digital phase detector, a fixation is made to a finally output value and feedback is not performed any longer, and thus a rectifier operates using only a delay circuit in an open manner. When feedback is stopped after comparisons have been made during the predetermined time without comparison via repeated feedback, additional current consumption required for the generation of feedback is removed, thereby achieving improvement in efficiency.

The active rectifier according to the present disclosure has the following advantages:

First, the active rectifier may prevent reverse leakage current from being generated even when an actually applied drive control signal is delayed due to internal circuit delay.

Second, the active rectifier detects an actually applied drive control signal only in the initial stage of operation, determines the extent of internal circuit delay based on the detected signal, and then generates corresponding delay via the control circuit and the delay circuit. Accordingly, a switching device control signal can be turned off in advance by taking into account the calculated extent of the internal circuit delay, and thus a switching device control signal can be generated using only the open-type delay circuit even when a negative feedback operation via continuous loop operation is not performed. As a result, an additional circuit for operating a loop and a corresponding area are not required, and power consumption can be minimized, thereby maximally increasing the efficiency of the active rectifier.

The above-described embodiments and the accompanying drawings are intended merely to illustrate part of the technical spirit of the present invention. Accordingly, the embodiments disclosed herein are not intended to limit the technical spirit of the present invention, but are intended to illustrate the technical spirit of the present invention. Therefore, it will be apparent that the scope of the technical spirit of the present invention is not limited by the embodiments. All modifications and specific embodiments that those skilled in the art can easily derive from the present specification and the accompanying drawings should be construed to be included in the range of the rights of the present invention.

What is claimed is:

1. An active rectifier, comprising:
    a rectifier unit comprising:
        first and fourth transistors configured to become conductive in an interval in which voltage of an alternating current (AC) input is negative, and to apply current of the AC input to a rectifier capacitor; and
        second and third transistors configured to become conductive in an interval in which the voltage of the AC input is positive, and to apply the current of the AC input to the rectifier capacitor;
    a driver unit configured to output first to fourth drive control signals to gates of the first to fourth transistors; and
    a switching device control circuit unit configured to compare the first drive control signal applied to the gate of the first transistor and the second drive control signal applied to the gate of the second transistor with the AC input, and to output switching device control signals adapted to delay the first to fourth drive control signals based on extents to which the first and second drive control signals are delayed.

2. The active rectifier of claim 1, further comprising a feedback control switch configured to control whether the first drive control signal and the second drive control signal are input to the switching device control circuit unit.

3. The active rectifier of claim 2, wherein the switching device control circuit unit is further configured to compare the first drive control signal and the second drive control signal with the AC input, and to turn off the feedback control switch, in response to the first drive control signal and the second drive control signal not being delayed.

4. The active rectifier of claim 1, wherein the switching device control circuit unit comprises:
    control circuit modules configured to receive the first drive control signal, the second drive control signal and the AC input, to compare the first drive control signal and the second drive control signal with the AC input, and to output delay extent control signals indicative of the extents to which the first and second drive control signals are delayed; and
    open-type delay circuit modules configured to receive the AC input, to process the AC input signal into a signal required for delay control, to receive the delay extent control signals output from the control circuit module, and to output the switching device control signals, wherein the switching device control signals are adapted to match the extents to which the first and second drive control signals are delayed to an extent of delay of the AC input using the signal required for delay control and the delay extent control signals.

5. The active rectifier of claim 4, wherein each of the control circuit modules comprises:

a voltage limiter configured to output the received AC input as a square waveform AC input; and a digital phase detector configured to compare the square waveform AC input with the received first drive control signal, and to output an up/down counter signal corresponding to a corresponding one of the delay extent control signals.

6. The active rectifier of claim 5, wherein the digital phase detector is further configured to increase or decrease a low side select comprising a control signal adapted to cause a multiplexer to select a signal input to a lower SR latch among the latches, wherein the lower SR latch is configured to output an output signal, in response to the selecting of the signal input to the lower SR latch.

7. The active rectifier of claim 6, wherein the driver unit comprises upper and lower drivers exhibiting delays to calculate a high side select by decreasing the low side select by a value, wherein the high side select is output to compensate for a difference between the delays.

8. The active rectifier of claim 4, wherein each of the open-type delay circuit modules comprises:

a voltage limiter configured to output the received AC input as a square waveform AC input;

an edge detector configured to output a signal obtained by detecting an edge of the square waveform AC input output from the voltage limiter;

a delay line configured to receive the signal output from the edge detector, and to output signals obtained by delaying the signal output from the edge detector by various times;

a multiplexer configured to select and output any one of the signals obtained by delaying the signal output from the edge detector by the various times and output from the delay line, by receiving and using one of the delay extent control signals; and SR latches each configured to receive the signal output from the edge detector and the signal output from the multiplexer, and to output the switching device control signal.

9. The active rectifier of claim 8, wherein the delay line comprises a coarse delay cell and fine delay cells.

* * * * *